May 22, 1956  P. L. MENAUL  2,746,921
ACIDIZING WELLS
Filed Jan. 20, 1954

INVENTOR.
PAUL. L. MENAUL
BY
ATTORNEY

United States Patent Office 2,746,921
Patented May 22, 1956

2,746,921
ACIDIZING WELLS
Paul L. Menaul, Tulsa, Okla.
Application January 20, 1954, Serial No. 405,177
11 Claims. (Cl. 252—8.55)

The present invention relates to the treatment of wells with acids for the purpose of increasing the production thereof. More particularly, this invention relates to an improved acid for treating wells. This application is a continuation-in-part of my copending application Serial Number 187,856, filed October 2, 1950, now Patent No. 2,717,876, dated September 13, 1955.

In the acid treatment of limestone and dolomite formations for the purpose of increasing the permeability and productivity thereof, a charge of acid is introduced through the well into the formation. The acid is allowed to remain in contact with the limestone and dolomite for a short time until it has dissolved some of the acid-soluble constituents of the formation. The acid becomes spent in a few minutes and is then withdrawn as by flowing or pumping the well. Although the use of well acids of the prior art have in many cases greatly increased the permeability and producing rate of a formation, they have not been altogether satisfactory for a number of reasons. For example, since limestone and dolomite formations contain varying amounts of acid-insoluble materials, the solubility of these formations in muriatic acid may be as low as 50 or 60%. I have found that the residue— i. e., the acid-insoluble portion of the formation—is in many cases a fine clayey silt which tends to settle out of the spent acid. Thus, while the acid may enlarge part of the pores of a formation near a well, the deposition of this silt in the formation appears to cause a complete plugging of other pores masking or negating the potential effectiveness of the acid job. It has also been noted that when calcareous formations containing both limestone and dolomite are treated with regular well acids, the acid attacks the limestone and becomes spent without affecting appreciably the dolomite. The overall effect or increase in permeability and productivity thus appears to be substantially less when limestone formations contain dolomite.

It is, therefore, an object of this invention to provide an improved composition of matter for acidizing formations. Another object of this invention is to provide an improved well acid which obviates the difficulties encountered in the use of prior well acids. A further object of this invention is to provide a well treating acid which prevents clogging of the permeable channels of a partially acid-soluble, calcareous formation with the acid-insoluble silt particles liberated from the formation by the action of the acid. A still further object of this invention is to provide an additive for well acids which inhibits settling of the silty residue so that it may be removed from the formation with the spent acid and, in addition, regulates the rate of reaction of the acid on the formations.

These and other objects of this invention will become apparent from the following description in which reference will be made to the accompanying drawings. In these drawings.

Figure 1:
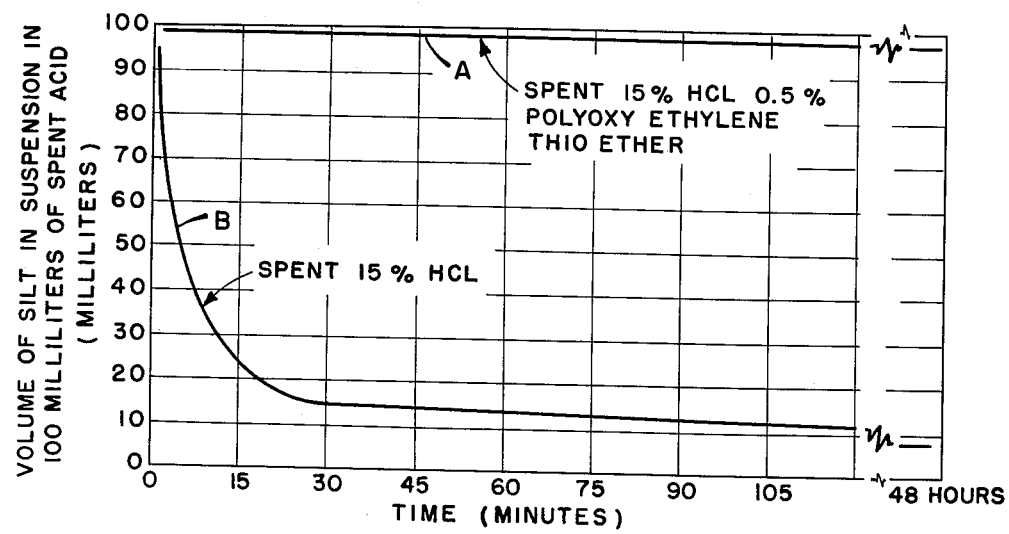
Figure 1 is a graph showing the difference in settling rate for silt initially suspended in spent plain acid and in the spent acid containing various percentages of surface-active agent according to this invention.

I have found that the objects of this invention may be accomplished by the addition of a surface-active agent to the acid used in acidizing a well. The acid may be any of the acids used in the treatment of wells for the purpose of enlarging the flow channels of the formation; e. g., hydrochloric, hydrofluoric, mixtures thereof, or the like. In general, any acid which, upon reaction with a formation, forms a water-soluble salt may be treated in accordance with this invention to accomplish these objects.

The surface-active agent acid additive is, in the first place, non-ionic in strong acid solutions or so weakly ionic as to be substantially non-ionic. As is customary in this art, a non-ionic surface-active agent will in this specification and claims refer to a water-soluble compound which does not give a positive test for anionic or cationic surface-active agents. Such tests are described by Schwarts and Perry in Surface Active Agents—Their Chemistry and Technology, published in 1949 by Interscience Publishers, Inc., New York. The surface-active agent additive used to regulate or control the relative reaction rates on limestones and dolomites and prevent deposition of silt in these formations is a water-soluble non-ionic ethylene oxide condensation product. More particularly, it is a tertiary dodecyl mercaptan reacted with about 10 mols of ethylene oxide to give an average molecular weight of about 660. A non-ionic surface-active agent of this type is manufactured by Monsanto Chemical Company and is available commercially at Sterox SE. A 15% water solution of this surface-active agent is also available commercially from the same manufacturer as Sterox 5 which is easier to handle under cold weather conditions.

This surface-active agent may be mixed with the acid at any time before the acid is injected into the well. The amount of surface-active agent appears to depend upon the volume of the acid solution. That is, the concentration of the acid may vary from 5 to 20% or more; but, the residue or spent acid having about the same acid concentration, the amount of surface-active agent-dispersant appears to depend upon the volume of material injected into the well. I have found that any amount of surface-active agent is effective to prevent settling of the silty residue. I prefer, however, to add more than about 0.1%, typically about 0.5% or more, by volume of the surface-active agent to the treating solution.

The acid containing the non-ionic surface-active agent and any other compatible additive desired is injected through the well into a formation in accordance with the regular acidizing procedure. The acid may be confined to selected zones, gelled, or in any other way handled like other acids. As pointed out hereinafter, a surface-active agent of this type has the property of retarding the reaction rate of an acid on limestone formations, so it is sometimes desirable to leave the acid in contact with the formation longer than is the case with regular or plain acid.

Referring now, more particularly, to Figure 1 to explain the nature of this invention, an excess of limestone in the form of small cores from the Pettit limestone formation, obtained from the Woodlawn Field, Texas, was exposed under 1000 pounds pressure to 100 ml. of regular 15% hydrochloric acid and to 100 ml. of the same acid containing 0.5% of Sterox 5 non-ionic surface-active agent. After the acid was completely spent, the bombs containing the samples were thoroughly agitated to suspend the silty residue. While the residue was still in suspension, the acid was drawn off into a 100 ml. graduate. An equal amount of each spent acid was placed in each graduate, and the volume of the silty acid below clear acid was plotted against time in minutes. By reference to curve A, it will be noted that substantially no settling could be detected after a period of 48 hours in the acid containing 0.5% of the surface-active agent.

By comparison with curve B, it will be noted that within about 30 minutes the silt in the spent regular acid had all settled and reached a substantially stable volume of about 14 ml. More dilute solutions of the surface-active agent inhibited settling of the residue somewhat in proportion to concentration of surface-active agent. There was no noticeable difference in the viscosity of the spent acid with the suspended silt and without the silt. Thus, it will be apparent that, with these reagents, the removal of silty residue from calcareous formations is greatly facilitated, whereby the pores enlarged by the acid will not become plugged if the spent acid is allowed to stand in the formation for a short time.

A sample of the residue from each of the above-mentioned tests was observed under the electron microscope to determine the particle size of the clay particles in each. In the regular acid residue, the clay or solid particles were of an average diameter of about 50 microns or larger, while the particles in the spent acid containing the polyoxyethylene thioether had a diameter of less than about 1 micron. This 50/1 ratio of particle sizes made the residues from the two tests easily distinguishable even to the eye, the particles in the plain acid appearing to be flocculated by the strong electrolyte. These large particles would not pass through the coarse filter paper in a standard API mud filter rate test. The fine particles in the polyoxyethylene thioether-acid solution by comparison passed readily through the filter paper.

Figure 2:
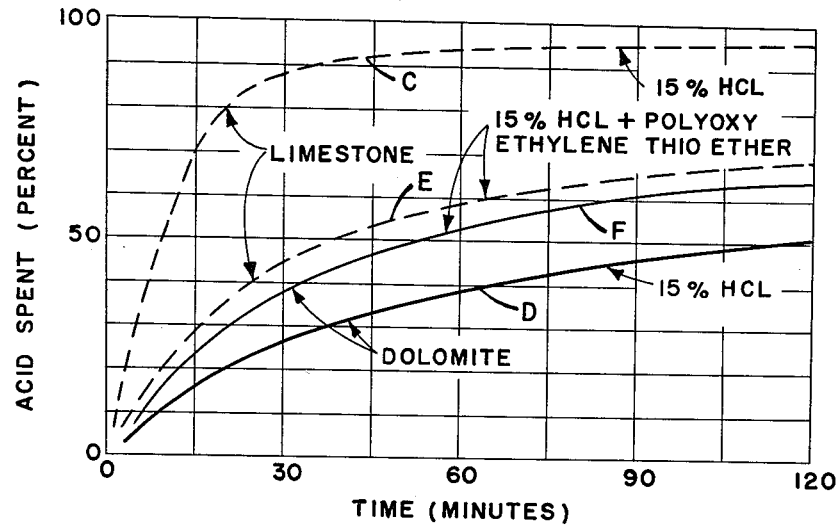
Figure 2 is a graph showing the rate of reaction on different amounts of pure limestone and pure dolomite of plain acid and of acid having the same concentration but containing an additive according to this invention.

The addition of a surface-active agent of the type specified appears to produce, in addition to the properties above set out, a number of other properties which are very desirable in well acids. Referring now more particularly to Figure 2, 100 ml. samples of regular 15% HCl and regular 15% HCl containing 0.5% of Sterox 5 surface-active agent were each placed in contact, at 100 p. s. i. and 100° F., with 100 cm.$^2$ of pure limestone and pure dolomite in the form of small cores. At short intervals, the concentration of the acid was determined and the results of each test plotted. The rate of acid reaction on limestone is, as indicated by curves C and E, materially retarded by the surface-active agent. For example, after 30 minutes of contact with the 100 square centimeter sample of limestone, the acid containing the surface-active agent, as indicated by curve E, was less than half spent, while the regular acid, as indicated by curve C, was almost completely spent.

It is well known that in the so-called dolomitic limes, that is, the limestone formations which contain dolomite, acid treatments are much less effective than in pure limestone formations. The Strawn lime of north Texas and the Madison lime of Wyoming are examples of such dolomitic limes. When such formations are acidized, the acid apparently becomes spent on the limestone without materially affecting the dolomite; and the productivity is increased only to a small degree, if at all. Referring now to curves D and F, additional tests were conducted at 100° F. and at 100 p. s. i. on pure San Andreas dolomite, each having 100 square centimeters of surface area, with 100 ml. samples of regular 15% hydrochloric acid alone, curve D, and with 0.5% of Sterox 5 non-ionic surface-active agent, curve F. The concentration of the acid versus time for each of the samples is shown. These typical curves show that the surface-active agent accelerated the reaction rate of the acid on the dolomite and retarded the reaction rate on the limestone, thereby substantially equalizing the reaction rate of the improved acid on the two when they are mixed so that such dolomitic limes may be acidized almost as effectively as pure limestone formations.

As an example of a field application of this invention, the Grayburg formation at a depth of 1452–1470 feet in a wildcat in Sterling County, Texas, was treated with 3500 gallons of 15% hydrochloric acid containing 18 gallons of Sterox 5. This well produced 4 barrels of oil per day with no water prior to the treatment. After treatment, the well produced oil and acid water containing silty residue for about 30 hours and then cleared up to produce 19 barrels of oil per day with no water. This treatment was considered very successful for this formation and this area where it is often considered impractical and uneconomical to acidize the Grayburg.

It will thus be apparent that I have provided an improved well treating agent and that my treating agent is subject to certain modifications. The invention is, however, not to be construed to be limited by the modifications presented, since they were presented for the purpose of illustration. The invention should, instead, be limited only by the scope of the appended claims.

I claim:

1. A method of acidizing a calcareous formation penetrated by a well comprising injecting into said formation an acid solution capable of dissolving said formation and a polyoxyethylene thioether produced by reacting a dodecyl mercaptan with sufficient ethylene oxide to have an average molecular weight of about 660, the ratio of thioether to said acid being great enough to suspend in the spent acid silty residue produced by the reaction of said acid on said formation.

2. A method of according to claim 1 in which the ratio of said polyoxyethylene thioether injected into said well comprises more than about 1 part per 1000 parts of said acid solution.

3. A method according to claim 1 in which said polyoxyethylene thioether is injected into said well dispersed in said acid solution.

4. A method according to claim 1 in which said dodecyl mercaptan is a tertiary dodecyl mercaptan.

5. A method according to claim 3 in which the concentration of said polyoxyethylene thioether in said acid is greater than about 0.1% by volume.

6. A method according to claim 3 in which said concentration of said polyoxyethylene thioether in said acid is about 0.5% by volume.

7. A well treating fluid for acidizing calcareous formations in a well which when acidized produce a silty residue comprising an acid capable of forming a water-soluble salt with said formation and releasing said silty residue and the reaction product of one mol dodecyl mercaptan and about 10 mols of ethylene oxide, said acid containing sufficient reaction product to suspend said silty residue in the spent acid solution until said solution is removed from said well.

8. A well treating fluid according to claim 7 in which the concentration of said reaction product in said acid is greater than about 0.1% by volume.

9. A well treating fluid according to claim 8 in which said concentration of said reaction product in said acid is about 0.5% by volume.

10. A method of acidizing a calcareous formation containing both limestone and dolomite and pentrated by a well comprising injecting into said formation an acid solution capable of dissolving said formation, said acid solution containing a thioether produced by reacting a tertiary dodecyl mercaptan with sufficient ethylene oxide to have an average molecular weight of about 660, the concentration of said thioether in said acid solution being great enough to equalize the reaction rate of said acid solution on said limestone and said dolomite.

11. A method according to claim 10 which greater than about 1 part of said thioether is added to 1,000 parts of said acid solution.

References Cited in the file of this patent

UNITED STATES PATENTS

| | | |
|---|---|---|
| 2,128,160 | Morgan | Aug. 23, 1938 |
| 2,205,021 | Schuette et al. | June 18, 1940 |
| 2,265,759 | Lawton et al. | Dec. 9, 1941 |
| 2,281,419 | De Groote et al. | Apr. 28, 1942 |